United States Patent
Song (10) Patent No.: US 8,054,622 B2
(45) Date of Patent: Nov. 8, 2011

(54) PORTABLE COMPUTER

(75) Inventor: Young-shin Song, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 11/872,754

(22) Filed: Oct. 16, 2007

(65) Prior Publication Data

US 2008/0266775 A1 Oct. 30, 2008

(30) Foreign Application Priority Data

Apr. 25, 2007 (KR) .................. 10-2007-0040441

(51) Int. Cl.
*G06F 1/16* (2006.01)
*G06F 3/033* (2006.01)

(52) U.S. Cl. .................. 361/679.55; 345/157
(58) Field of Classification Search ........... 361/679.01–679.45, 679.55–679.59; 345/156, 157, 168, 345/169

See application file for complete search history.

(56) References Cited

U.S. PATENT DOCUMENTS

| | | | |
|---|---|---|---|
| 5,953,199 A * | 9/1999 | Owens | 361/212 |
| 6,177,924 B1 * | 1/2001 | Bae | 345/157 |
| 6,219,038 B1 * | 4/2001 | Cho | 345/173 |
| 6,859,355 B2 * | 2/2005 | Chuang et al. | 361/679.1 |
| 6,933,929 B1 * | 8/2005 | Novak | 345/173 |
| 7,119,291 B2 * | 10/2006 | Sun | 200/5 A |
| 2006/0022957 A1 | 2/2006 | Lee | |
| 2009/0303680 A1 * | 12/2009 | Mihara et al. | 361/679.55 |

FOREIGN PATENT DOCUMENTS

| | | |
|---|---|---|
| CN | 1403890 A | 3/2003 |
| CN | 1728053 A | 2/2006 |

OTHER PUBLICATIONS

Office Action issued in Chinese Patent Application No. 200810094259.1 on Aug. 24, 2011.

* cited by examiner

*Primary Examiner* — Jayprakash N Gandhi
*Assistant Examiner* — Nidhi Desai
(74) *Attorney, Agent, or Firm* — Stanzione & Kim, LLP (57) ABSTRACT

A portable computer includes a main body casing including an upper plate and an opening formed on the upper plate; a cover pad which may be coupled to the upper plate and covers the opening, the cover pad having a plate surface and a rear surface; and a touch-pad coupled to the rear surface of the cover pad through the opening, thus protecting the touch-pad and enabling the touch-pad to sense a coordinate touched on the plate surface and generate a position data of a pointer.

19 Claims, 7 Drawing Sheets

PORTABLE COMPUTER

CROSS-REFERENCE TO RELATED APPLICATIONS

This application claims priority from Korean Patent Application No. 10-2007-0040441, filed on Apr. 25, 2007 in the Korean Intellectual Property Office, the disclosure of which is hereby incorporated in its entirety by reference.

BACKGROUND OF THE INVENTION

1. Field of the Invention

The present general inventive concept relates to a portable computer, and more particularly, to a portable computer which has an enhanced mounting structure for a touch-pad.

2. Description of the Related Art

Technology to make a portable computer small and light has been applied in consideration of mobility, convenient use, and economy, thereby allowing a user to use the portable computer anywhere. The portable computer typically includes a main body unit to process data and a display unit to display the data into visualized objects. To designate one of the plurality of visualized objects, a cursor or a pointer under the control of a user is displayed as an image. In a desktop computer where mobility is irrelevant, a mouse is typically used to control and move the pointer. With portable computers, a touch-pad is typically employed to allow a user to control and move the pointer as the user wishes. The touch-pad is typically mounted on a casing which forms an external appearance with respect to the main body unit.

In conventional portable computers, a through hole is typically formed on the casing, and a plate surface of the touch-pad is exposed via the through hole from an inner surface of the casing. A separate bracket is coupled to the inner surface of the casing by a screw or the like to support the touch-pad. One disadvantage of such a configuration is that a height difference between an outer surface of the casing and the plate surface of the touch-pad causes an undesirable external appearance of the touch-pad. Moreover, a user's hand may be uncomfortable during operation of the touch-pad due to the height difference. Furthermore, because an additional assembly process is required to couple the separate bracket to the inner surface of the casing by a screw, the cost of making the device increases and productivity and efficiency decreases owing to the additional process.

In other conventional portable computers, the casing may be manufactured by injection-molding or similar processes in order to maintain a relatively thin region for the touch-pad. The touch-pad is then typically adhered to the thin region from the inner surface of the casing by double-sided adhesive tape.

In these conventional portable computers, the thickness of the casing is typically less than about 0.7 mm so that the touch-pad attached to the inner surface of the casing will recognize a touched coordinate when a user touches the outer surface of the casing. However, such a relatively thin region causes difficulty in manufacturing the casing and increases possibility of damage due to an external impact.

Also, because the touch-pad is supported to the casing by only the double-sided adhesive tape, the adhesive strength of the double-sided adhesive tape must be strong enough to overcome the weight of the touch-pad. One consequence of this design is that the strong adhesive strength of the double-sided adhesive tape must be overcome to separate and change the touch-pad from the casing. Accordingly, it is difficult to separate the touch-pad for installation or maintenance purposes, and the adhesive area of the touch-pad or the casing may be damaged when the touch-pad is separated from the casing.

The above-described problems may be avoided if the touch-pad is stably supported.

SUMMARY OF THE INVENTION

The present general inventive concept provides a portable computer in which a touch-pad is stably mounted to a main body casing in a relatively simple and cost-effective manner without difficulty.

The present general inventive concept also provides a portable computer which has a simple structure of stably supporting a touch-pad.

Additional aspects and utilities of the present general inventive concept will be set forth in part in the description which follows and, in part, will be obvious from the description, or may be learned by practice of the general inventive concept.

The foregoing and/or other aspects of the present general inventive concept may be achieved by providing a portable computer including a main body casing which includes an upper plate and an opening formed on the upper plate, a cover pad which is coupled to the upper plate and covers the opening, the cover pad having a plate surface and a rear surface, and a touch-pad which may be coupled to the rear surface of the cover pad through the opening to enable the touch-pad to sense a coordinate touched on the plate surface and generate position data of a pointer according to the sensed coordinate.

The main body casing may include a supporting part recessed from the upper plate, and the opening may be formed in the supporting part.

The cover pad may be fitted into and melting-bonded to the supporting part.

The supporting part may include a lateral wall bent from the upper plate, and a mounting part which may be bent and extended from the lateral wall to form the opening, and wherein the rear surface of the cover pad may be mounted to the mounting part.

The portable computer may further include a cover pad coupling member which couples the cover pad and the mounting part.

The cover pad coupling member may include at least one supporting protrusion extended from one of the cover pad and the mounting part toward the other one, and a protrusion accommodating part which may be formed on the other one to receive the supporting protrusion.

The supporting protrusion may be extended from the cover pad toward the mounting part, and the supporting protrusion may penetrate through the mounting part so that an end part of the supporting protrusion passes through the protrusion accommodating part, and wherein the end part may be melting-bonded to the rear surface of the mounting part.

The cover pad coupling member may include a double-sided adhesive tape.

The portable computer may further include a touch-pad coupling member which couples the cover pad and the touch-pad.

The cover pad may include a non-conductive material.

A corrosion process may be applied to a top surface of the cover pad.

The foregoing and/or other aspects of the present general inventive concept may also be achieved by providing a portable computer including a main body casing having a lateral wall to define an opening, and a mounting part protruding from the lateral wall to define another opening, a cover pad disposed in the opening on the mounting part, and a touch-pad disposed in the another opening and coupled to the cover pad.

The opening of the lateral wall may be larger than the another opening.

The cover pad may include a plate surface and a rear surface, and the rear surface may include a first portion disposed on the mounting part and a second portion to correspond to the touch-pad.

The main body may include an upper plate, the lateral wall may be recessed from the upper plate to have an angle with respect to the upper plate, and the mounting part may be extended from the lateral wall to have another angle with respect to the lateral wall.

A gap may be provided between the touch-pad and the another opening.

The plate surface of the cover pad may be mounted flush with the upper plate when the cover pad is disposed on the mounting part.

The cover pad may provide an air-tight seal between the touch-pad and the mounting part.

The foregoing and/or other aspects of the present general inventive concept may also be achieved by providing a method of installing a touch-pad into a portable computer having a main body casing including an upper plate, a cover pad having a plate surface and a rear surface, and a supporting part formed from the upper plate, the supporting part being recessed from the upper plate and having an opening to receive a touch-pad, the method including inserting the cover pad into the supporting part so that the plate surface is mounted flush with the upper plate, and coupling the touch-pad to a second portion of the rear surface through the opening to enable the touch-pad to sense a coordinate touched on the plate surface and generate position data of a pointer according to the sensed coordinate.

A melting-bonded part may be provided to firmly couple the cover pad to the supporting part.

The melting-bonded part may be heated to separate the cover pad from the supporting part.

BRIEF DESCRIPTION OF THE DRAWINGS

These and/or other aspects and utilities of the present general inventive concept will become apparent and more readily appreciated from the following description of the embodiments, taken in conjunction with the accompanying drawings, in which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 1:
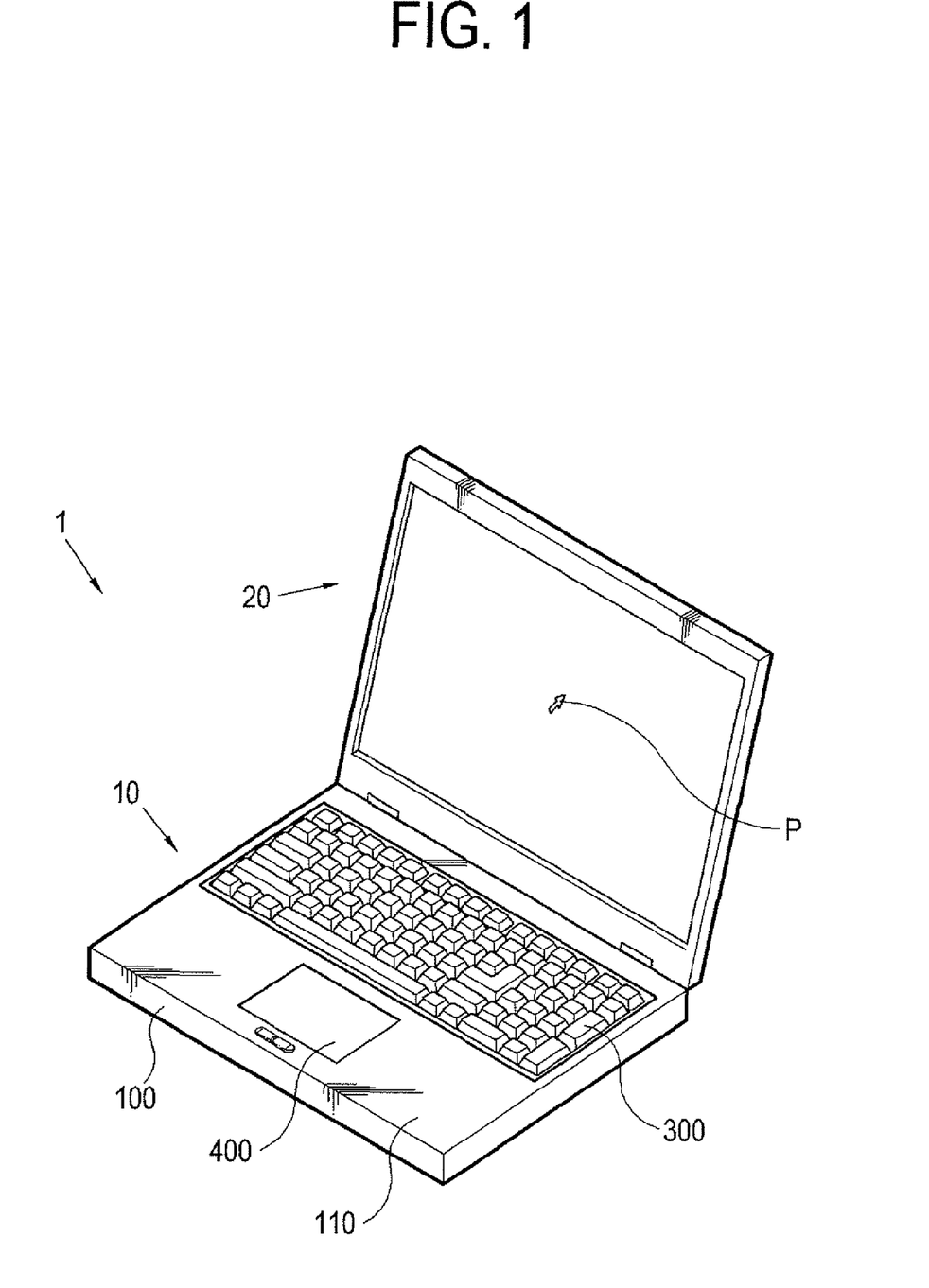
FIG. 1 is a perspective view illustrating a portable computer according to an exemplary embodiment of the present general inventive concept.

As illustrated in FIG. 1, a portable computer 1 according to an exemplary embodiment of the present general inventive concept may include a main body unit 10 which processes and stores data, and a display unit 20 rotatably coupled to the main body unit to receive image information processed in the main body unit 10, display an image based on the image information, and visualize a pointer P.

Figure 2:
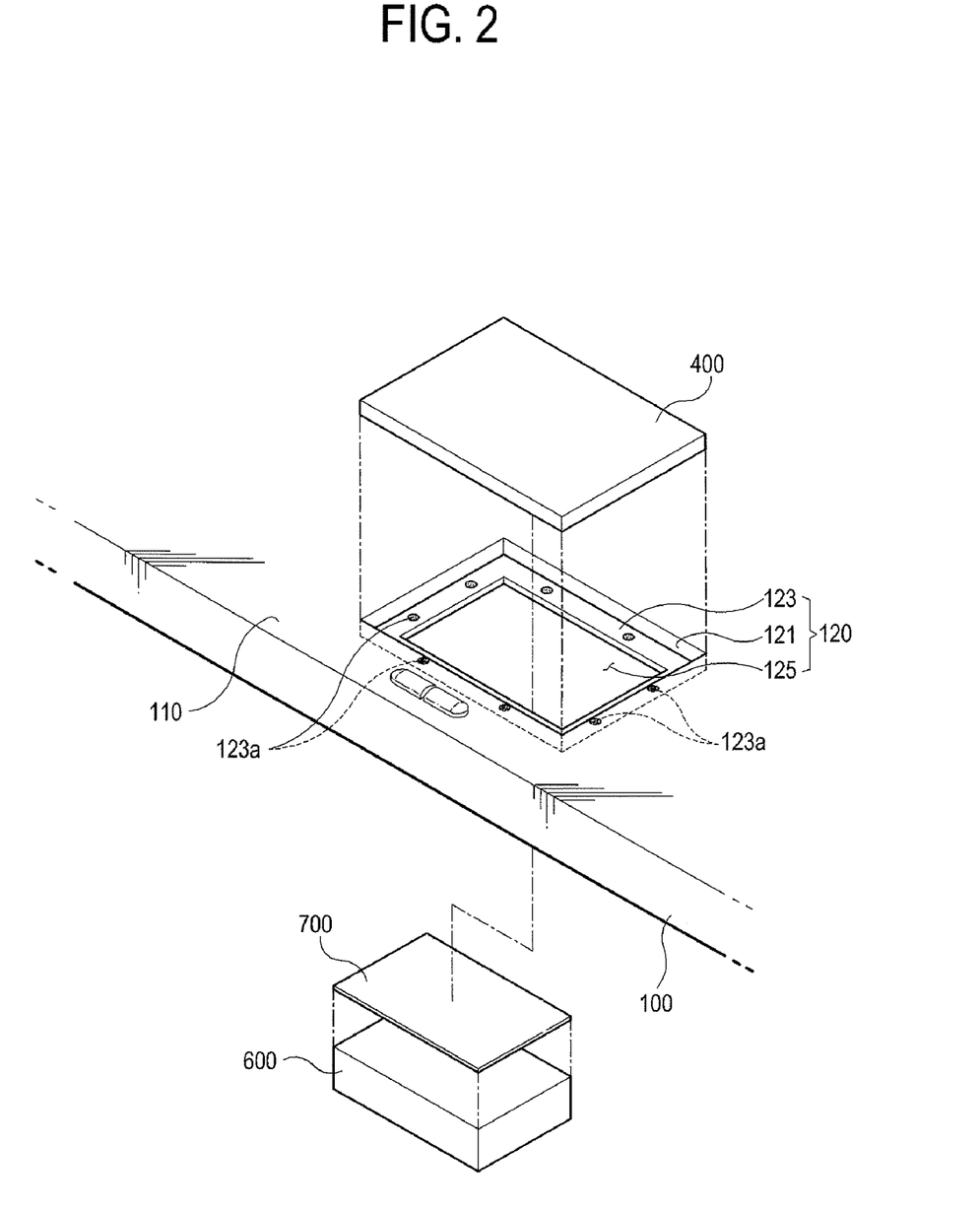
FIG. 2 is a partial perspective view illustrating a touch-pad separated from the portable computer of FIG. 1.

Referring to FIGS. 1 and 2, the main body unit 10 may include a main body casing 100, a keyboard unit 300 provided outside the main body casing 100 to facilitate a user's input, a cover pad 400 coupled to the main body casing 100, a touch-pad 600 mounted on a rear or bottom surface of the cover pad 400 to move and control a pointer P, and a touch-pad coupling member 700 which couples the cover pad 400 and the touch-pad 600.

The main body casing 100 forms an external appearance of the main body unit 10, and has an inner area space which receives and supports sub-components constituting the main body unit 10 therein. The main body casing 100 may be shaped in the form of a rectangular box having a predetermined thickness, and may include a light and hard material such as plastic or other suitable material in consideration of mobility and economy. One edge side of the main body casing 100 may be rotatably coupled with the display unit 20.

When the main body casing 100 is supported on an installation surface such as a desk or other surface, a lower plate (not shown) of the main body casing 100 contacts the installation surface. An upper plate 110 may be opened or removed in an opposite direction relative to a bottom surface (not shown), i.e., in an upward direction. The lower plate (not shown) and the upper plate 110 may be separately provided so that the touch-pad 600 can be coupled to the rear surface of the cover pad 400 from the inside of the main body casing 100 in a relatively simple and cost-effective manner. As illustrated in FIG. 2, the main body casing 100 may include a supporting part 120 which accommodates and supports the cover pad 400 in a predetermined region of the upper plate 110.

Referring to FIGS. 1 and 2, when the display unit 20 rotates to cover the main body unit 10, the upper plate 110 of the main body casing 100 may be covered by the display unit 20. A user input device such as the keyboard unit 300 and touch-pad 600 may be installed on the upper plate 110 so that a user can easily access the upper plate 110 among exposed parts of the main body casing 100 when the portable computer 1 is placed on the installation surface and the display unit 20 is opened from the main body unit 10.

Figure 3:
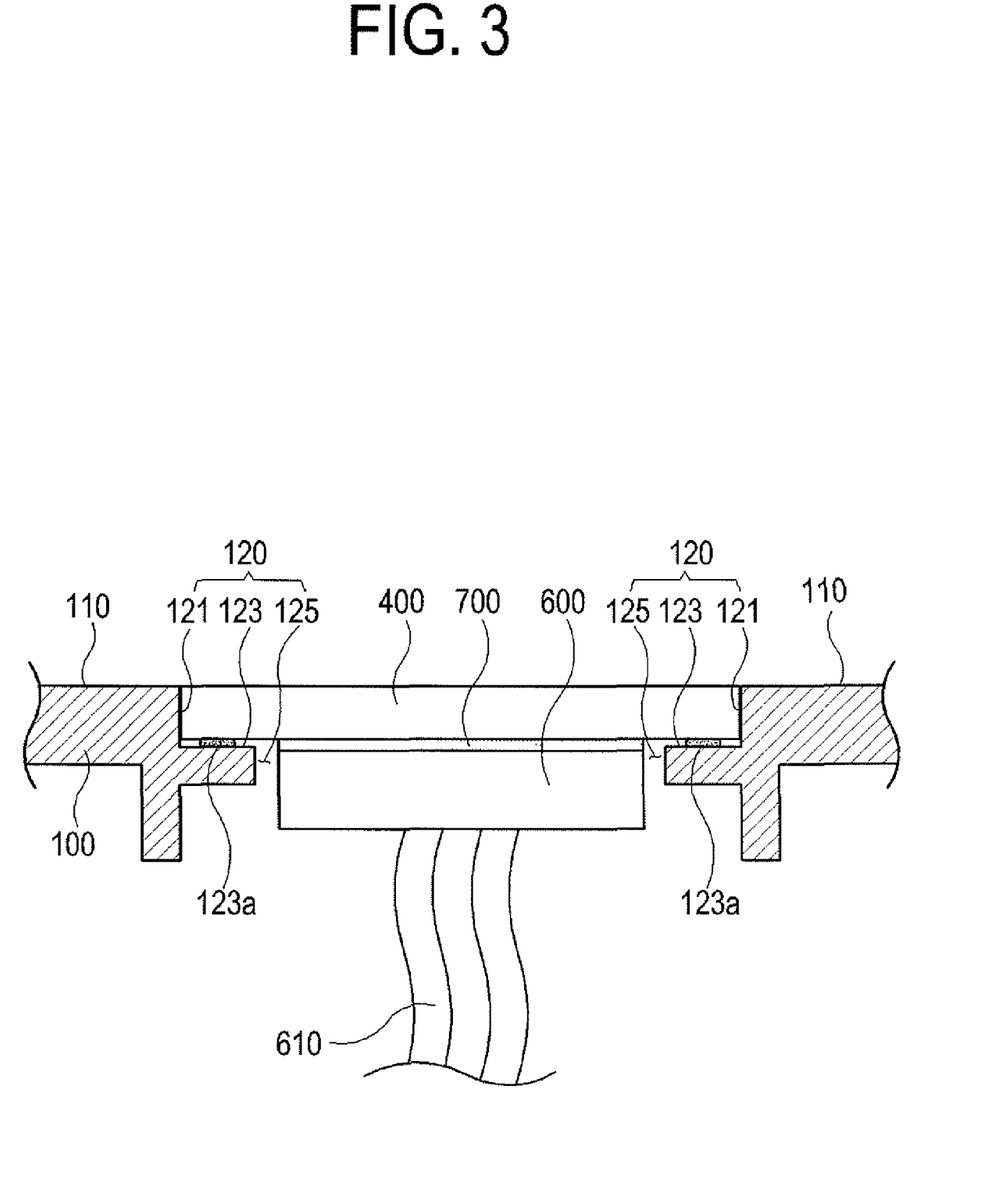
FIG. 3 is an assembled sectional view illustrating a touch-pad in the portable computer of FIG. 2.

The supporting part 120 accommodates and supports the cover pad 400, and may be recessed from the upper plate 110 to form an opening for the cover pad 400. The supporting part 120 may include a lateral wall 121 bent from a top surface of the upper plate 110, a mounting part 123 bent from the lateral wall 121, and an opening 125 adjacent to the mounting part 123 defined by a side wall of the mounting part 123, and formed through the supporting part 120 to accommodate the touch-pad 600. The supporting part 120 forms another opening defined by the lateral wall 121 to accommodate the cover pad 400. As illustrated in FIG. 3, the opening of the lateral wall 121 may be larger than the opening of 125 of the mounting part 123. The mounting part 123 may have a supporting surface on which the cover pad 400 is disposed. The bent angle between the top surface of the upper plate 110 and the lateral wall 121 and a bent angle between the lateral wall 121 and the mounting part 123 are not limited. For example, the angles may be right angles in consideration of the rectangular shape of the cover pad 400, although it is understood that each bent angle may be configured to correspond to the particular shape of the cover pad 400 supported in the supporting part 120. In this exemplary embodiment of the present general inventive concept, the touch-pad 600 and the cover pad 400 may include rectangular plate shapes, but many other shapes may be used without departing from the principles and spirit of the general inventive concept.

The lateral wall 121 may be perpendicularly bent from the top surface of the upper plate 110 and extended toward the inside of the main body casing 100. The lateral wall 121 may support a side part of the cover pad 400 so as to inhibit parallel movement of the cover pad 400 with respect to the upper plate 110. The supporting part 120 supporting the single cover pad 400 may include two pairs of the lateral walls 121 disposed opposite to each other and configured in shape and size to correspond to the shape and size of the cover pad 400, for example a rectangular shape. The distance between the opposing lateral walls 121 of the respective pairs may be dimensioned to forcibly fit the cover pad 400 into the supporting part 120. In this way, the cover pad 400 may be firmly coupled to the supporting part 120 with a press fit between the lateral walls 121.

Referring to FIG. 3, the height of the lateral wall 121, i.e., an extension length from the top surface of the upper plate 110 to the mounting part 123 may be determined in various manners. However, in this exemplary embodiment of the general inventive concept, the height of the lateral wall 121 may be dimensioned to make the cover pad 400 even or flush with the upper plate 100 when the cover pad 400 is mounted to the supporting part 120. In this way, the portable computer 1 may present a more pleasing external appearance. Moreover, by positioning the cover pad 400 flush with the upper plate 100, operation of the cover pad 400 by the user's hand may be more convenient and comfortable.

The mounting part 123 may be bent from one end part of the lateral wall 121 adjacent the opening 125. The other end part of the lateral wall extends from the upper plate 110. The mounting part 123 may be extended from at least one of the lateral walls 121 toward the opposite lateral wall 121. Further, the surface of the mounting part 123 may be extended in parallel with the upper plate 110. Accordingly, the mounting part 123 may be configured to overcome the weight of the cover pad 400 and to support a rear edge area (i.e. first portion) of the cover pad 400.

As illustrated in FIG. 3, the mounting part 123 may further include a melting adhesive part 123a formed on an area of the mounting part 123 to be in contact with the mounted cover pad 400. To form the adhesive part 123a, a melting resin or other suitable adhesive material may be applied or dropped on the mounting part 123 before the cover pad 400 is fitted into the supporting part 120. The cover pad 400 may then be mounted on the mounting part 123 before the spread melting resin or adhesive is cured. The spread melting resin or adhesive may then harden or cure between the cover pad 400 and the mounting part 123 to form the melting adhesive part 123a, thus fixedly coupling the cover pad 400 to the mounting part 123.

The opening 125 passes through the supporting part 120 at a place adjacent to an end of the mounting part 123. When the cover pad 400 is supported by the supporting part 120, a rear center region of the cover pad 400 may be exposed to an inside area of the main body casing 100 through the opening 125. Accordingly, the touch-pad 600 may then be coupled to a rear surface of the cover pad 400 from the inside of the main body casing 100. In this way, at least one part of the touch-pad 600 may be accommodated in the opening 125. The width of the opening 125 may be configured larger than that of the touch-pad 600 to form a gap between the side wall of the mounting part 123 and the sides of the touch-pad 600.

As illustrated in FIG. 3, the cover pad 400 may be supported by the supporting part 120 to cover the upper surface of the touch-pad 600 so as to minimize any abrasion or damage to the touch-pad 600 due to a touch of the user or from an outside collision.

The cover pad 400 may be made of a non-conductive material such as plastic. In this way, touched coordinates may be precisely sensed in the touch-pad 600 under the touched cover pad 400 when the user touches the plate surface of the cover pad 400.

The thickness of the cover pad 400 is not limited and may be varied according to a number of factors. For example, if the cover pad 400 is too thin to protect the touch-pad 600, the touch-pad 600 may be easily damaged. On the other hand, if the cover pad 400 is too thick to sense the touched coordinates, additional costs may be incurred to improve the sensitivity of the touch-pad 600.

Referring again to FIG. 3, when the cover pad 400 is supported by the supporting part 120, the top surface of the cover pad 400 may be configured to be even or flush with the upper plate 110 to minimize any height difference between the cover pad 400 and the upper plate 110. In this way, a pleasing external appearance of the upper plate 110 and cover pad 400 may be presented to the user, and operation of the cover pad 400 by a user's hand may be more convenient and comfortable to the user.

It is understood that the cover pad 400 may be provided with a different color than the upper plate 110 and/or may have various patterns provided on a top surface of the cover pad 400 by a surface treatment, so that a user may feel an aesthetically pleasing external appearance of the portable computer 1 and easily recognize the position of the cover pad 400.

The surface treatment may include a corrosion process to be applied to the upper surface of the cover pad 400 to provide a beautiful pattern to the cover pad 400 and/or to minimize abrasion due to external impacts or from a user's touch. It is understood that other known or later developed surface treatment processes may also be used to achieve the same or similar results without departing from the principles and spirit of the present general inventive concept.

As illustrated in FIG. 3, the touch-pad 600 may be coupled to the rear surface of the cover pad 400 from an inside area of the main body casing 100 through the opening 125. The width of the touch-pad 600 in left and right directions may be smaller than the width of the opening 125. The touch-pad 600 may include a transmitting member 610 through which the touch-pad 600 generates position data of a pointer P, and transmits the position data to a main board unit (not shown) accommodated in the main body casing 100.

Referring to FIGS. 2 and 3, a touch-pad coupling member 700 may be provided to couple the cover pad 400 and the touch-pad 600. The touch-pad coupling member 700 may be achieved in various ways chosen with sound engineering judgment so long as it can suitably couple the cover pad 400 and the touch-pad 600. For example, the touch-pad coupling member 700 may include a double-sided adhesive tape to simplify the configuration and reduce the occupying space and cost of the coupling member 700. The touch-pad coupling member 700 may then be provided with an adhesion level sufficient to overcome the weight of the touch-pad 600.

The touch-pad coupling member 700 may be interposed between a portion of the rear surface of the cover pad 400 toward the inside of the main body casing 100 through the opening 125 and the top surface of the touch-pad 600. The touch-pad coupling member 700 may comprise a suitable material and thickness to sense when a user touches the top surface of the cover pad 400 without interference.

By this configuration, a process of mounting the touch-pad 600 on the main body casing 100 in the portable computer 1 according to an exemplary embodiment of the present general inventive concept may be described with reference to FIGS. 2 and 3.

A melting resin or other adhesive material may be applied or dropped on the mounting part 123. The cover pad 400 may then be fitted into the supporting part 120 before the melting resin or the adhesive is hardened. The rear surface of the cover pad 400 may be inserted between the lateral walls 121 in order to contact the mounting part 123 and with pressure on the melting resin or adhesive.

The melting resin or adhesive may then harden between the cover pad 400 and the mounting part 123 to form the melting adhesive part 123a. In this way, the cover pad 400 may be firmly coupled to the supporting part 120, and the center area of the rear surface of the cover pad 400 may be coupled to the supporting part 120 so that the rear surface faces inward toward the inner area of the main body casing 100 through the opening 125.

The touch-pad coupling member 700 may be adhered to the top surface of the touch-pad 600. The touch-pad 600 may be pressed from the inside of the main body casing 100 to the cover pad 400 through the opening 125 while the top surface of the touch-pad 600 faces the rear surface of the cover pad 400. The touch-pad coupling member 700 may be formed between the touch-pad 600 and the cover pad 400 to couple the touch-pad 600 to the cover pad and to overcome the weight of the touch-pad 600.

In this way, the touch-pad 600 and the cover pad 400 may be easily mounted in the main body casing 100 in a relatively simple and cost-effective manner.

The configuration to couple the cover pad 400 with the supporting part 120 is not limited to the exemplary embodiment described above, and various methods may be applied thereto. Accordingly, another exemplary embodiment will be described in order to appreciate the broader scope of the principles and spirit of the present general inventive concept. The description related to the elements having the same structure and function will be omitted.

Figure 4:
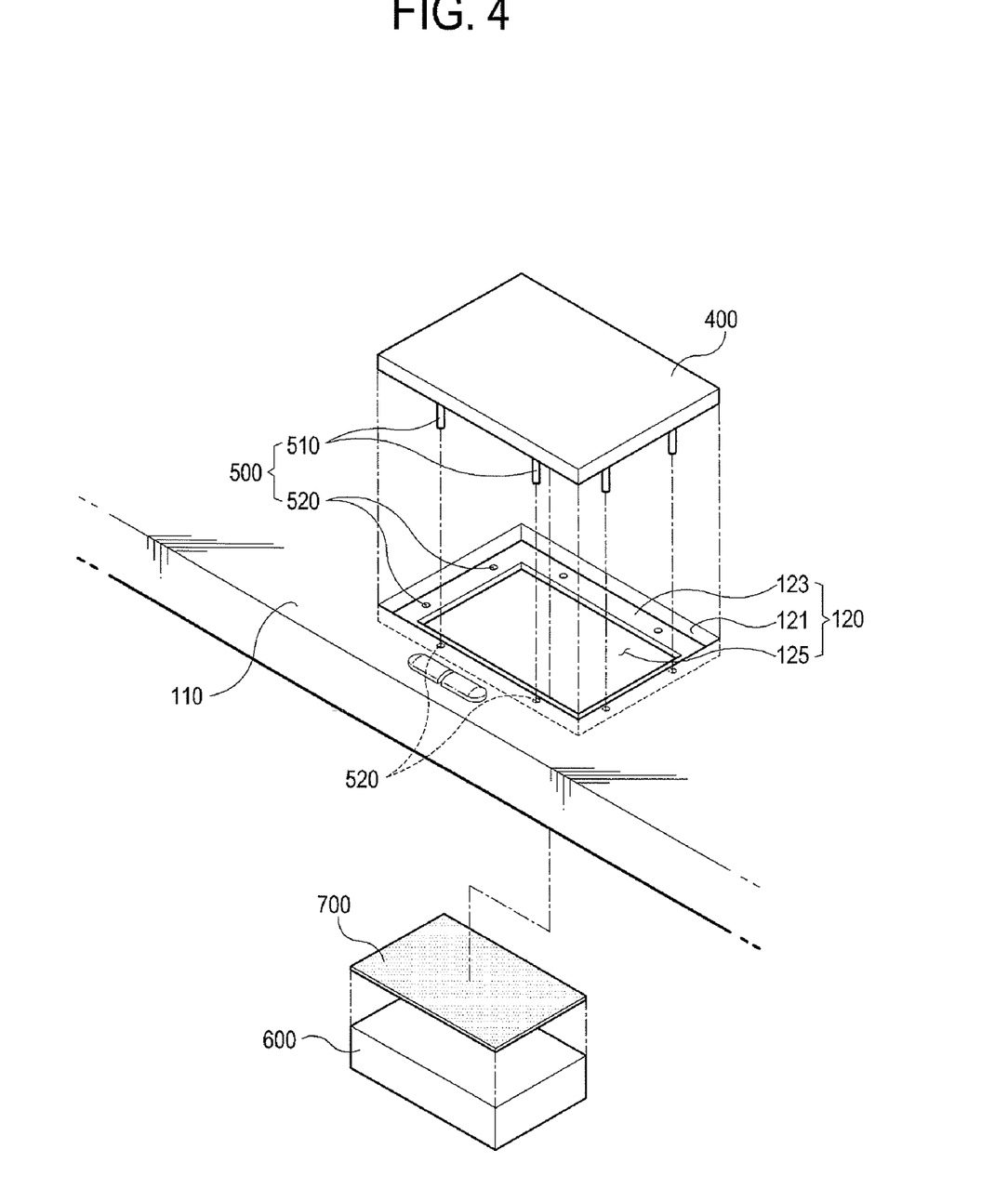
FIG. 4 is a partial perspective view illustrating a touch-pad separated from a portable computer according to an exemplary embodiment of the present general inventive concept.

As illustrated in FIG. 4, the portable computer according to another exemplary embodiment of the present general inventive concept includes a cover pad coupling member 500 which couples the cover pad 400 to the main body casing 100.

The cover pad coupling member 500 couples the mounting part 123 and the cover pad 400. For this, the cover pad coupling member 500 may include at least one supporting protrusion 510 extended toward the mounting part 123 from the rear surface of the cover pad 400, and a protrusion accommodating part 520 which passes through the mounting part 123 corresponding to the supporting protrusion 510 in order to receive the supporting protrusion 510.

When the cover pad 400 is supported to the supporting part 120, the supporting protrusion 510 may be placed in the rear surface of the cover pad 400 contacting the mounting part 123. The plurality of supporting protrusions 510 may be spaced apart from each other and may protrude from an edge area of the rear surface of the cover pad 400 toward the mounting part 123.

The protrusion accommodating part 520 may penetrate the mounting part 123 at a position corresponding to the supporting protrusion 510. The protrusion accommodating part 520 penetrates the mounting part 123 in a lengthwise direction of the supporting protrusion 510, that is, in a direction to mount the cover pad 400 on the mounting part 123. In this way, the protrusion accommodating part 520 accommodates the supporting protrusion 510 when the cover pad 400 is mounted on the mounting part 123.

Figure 5:
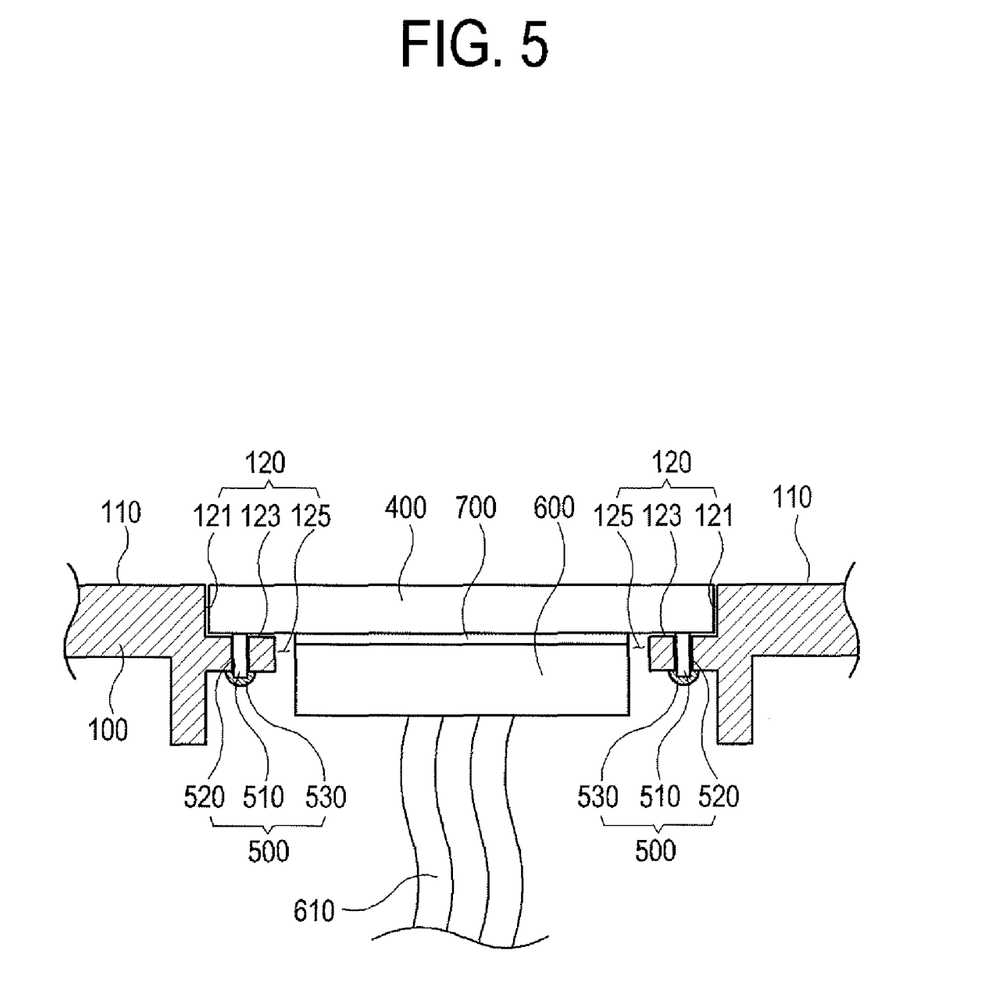
FIG. 5 is an assembled sectional view illustrating a touch-pad in the portable computer of FIG. 4.

To inhibit the supporting protrusion 510 from separating from the protrusion accommodating part 520 by an external force after the protrusion accommodating part 520 accommodates the supporting protrusion 510, various technologies may be used. For example, as illustrated in FIG. 5, the supporting protrusion 510 may be longer than the protrusion accommodating part 520, so that an end part of the supporting protrusion 510 penetrates through the protrusion accommodating part 520 and may be exposed to the inner area of the main body casing 100 through a rear surface of the mounting part 123 when the cover pad 400 is completely mounted on the mounting part 123. Then, the exposed end part of the supporting protrusion 510 may be melted and bonded to the rear surface of the mounting part 123, thereby forming a melting bonding part 530. In this way, the supporting protrusion 510 may be firmly supported in the protrusion accommodating part 520 by the melting bonding part 530. Alternatively, the external diameter of the supporting protrusion 510 and an internal diameter of the protrusion accommodating part 520 may be configured to provide a press fit so that the supporting protrusion 510 can be forcibly fitted into the protrusion accommodating part 520.

By this configuration, a process of mounting the touch-pad 600 to the main body casing 100 in the portable computer 1 according to another exemplary embodiment of the present general inventive concept may be described with reference to FIGS. 4 and 5.

The cover pad 400 may be mounted to the mounting part 123 such that the supporting protrusion 510 faces the protrusion accommodating part 520. The supporting protrusion 510 may be accommodated in the protrusion accommodating part 520, and the end part of the supporting protrusion 510 may be exposed to the inner area of the main body casing 100 beyond the protrusion accommodating part 520 when the cover pad 400 is completely mounted to the mounting part 123.

The end part of the supporting protrusion 510 may then be melted and bonded to the rear surface of the mounting part 123, thereby forming a melting bonding part 530. Accordingly, the supporting protrusion 510 may be inhibited from separating from the protrusion accommodating part 520 by the melting-bonding part 530, and the cover pad 400 may be firmly coupled to the supporting part 120.

The process of coupling the touch-pad 600 to the rear surface of the cover pad 400 from the inside of the main body casing 100 through the opening 125 is similar to that of the other exemplary embodiments, and thus descriptions thereof will be omitted.

To disassemble the touch-pad 600 from the main body casing 100, the melting bonding part 530 may be removed by heating the melting bonding part 530 or the like, and then the cover pad 400 may be separated from the mounting part 123. At the same time, the supporting protrusion 510 may also be separated from the protrusion accommodating part 520. The touch-pad 600 may thus be coupled to the rear surface of the cover pad 400 so that if the cover pad 400 is separated from the supporting part 120, the touch-pad 600 may also be separated from the main body casing 100.

Accordingly, the touch-pad 600 and the cover pad 400 may be mounted to and separated from the main body casing 100 in a relatively simple and cost-effective manner for easy replacement.

In the portable computer 1 of the present general inventive concept, the configuration of the cover pad coupling member 500 to couple the cover pad 400 to the supporting part 120 is not limited to the exemplary embodiments described above. Accordingly, yet another exemplary embodiment having a configuration of the cover pad coupling member 500 will be described with reference to FIGS. 6 and 7.

Figure 6:
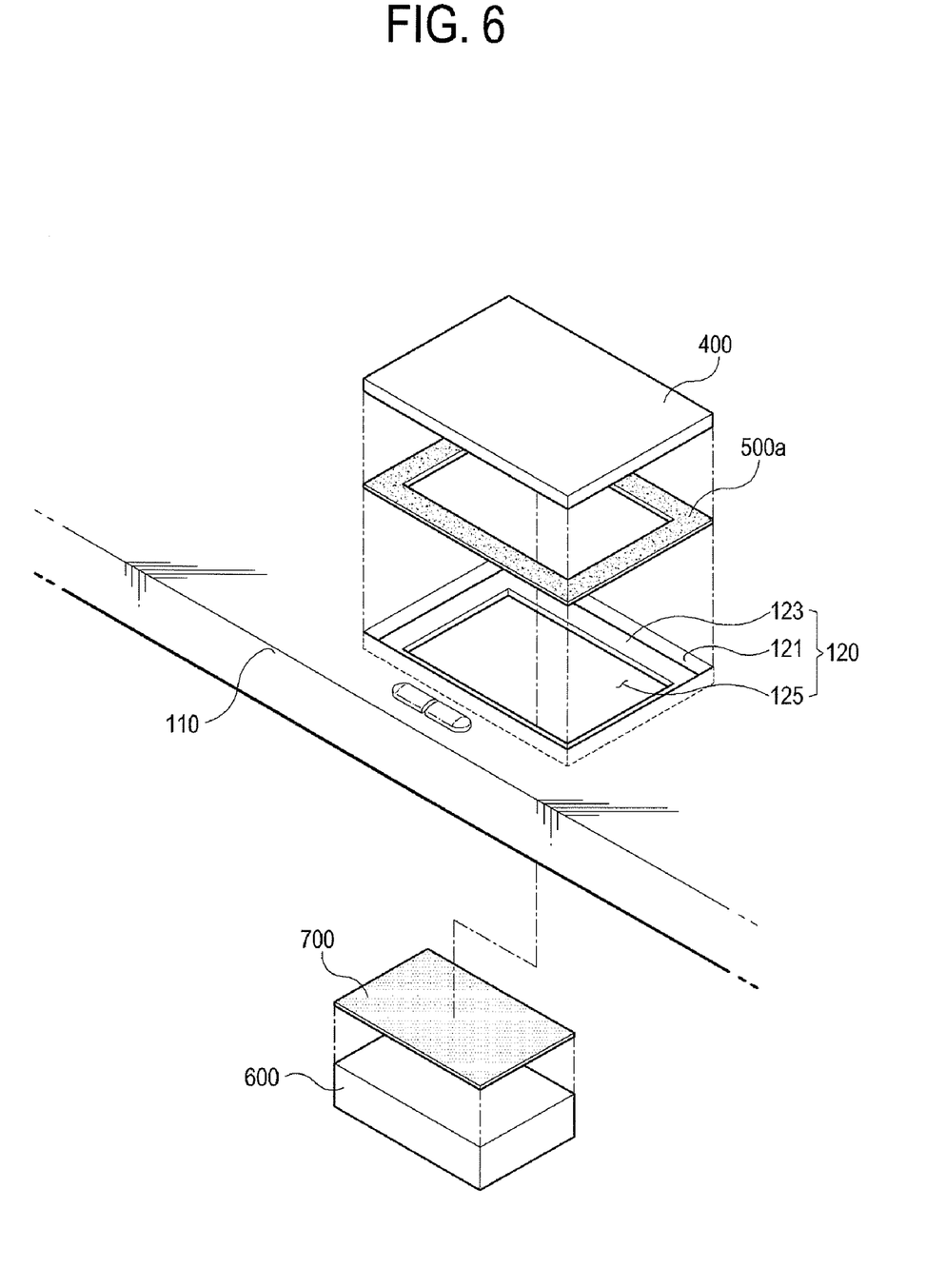
FIG. 6 is a partial perspective view illustrating a touch-pad separated from a portable computer according to an exemplary embodiment of the present general inventive concept.

As illustrated in FIG. 6, a portable computer 1 may include a cover pad coupling member 500a to couple the cover pad 400 to a mounting part 123.

The cover pad coupling member 500a may include a double-sided adhesive tape to simplify the configuration and reduce the occupying space and cost of the coupling member 500a. The cover pad coupling member 500a may be interposed between the mounting part 123 and the cover pad 400 in an area where the mounting part 123 contacts the cover pad 400 to provide an enhanced air-tight seal between the touch-pad 600 and the inside of the main body casing 100. In this way, the inside area of the main body casing 100 may be safe even though a liquid or other substance may be spilled on the upper plate 110.

Figure 7:
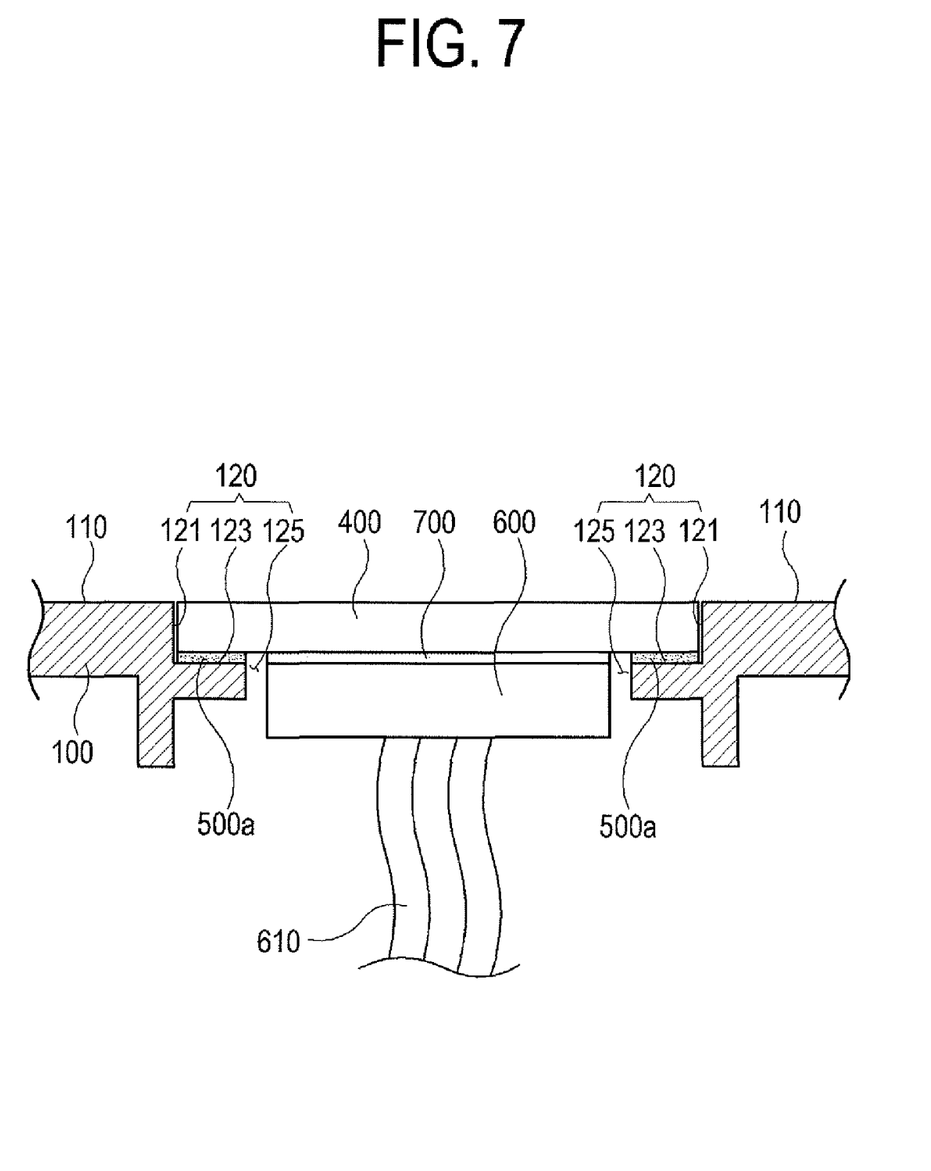
FIG. 7 is an assembled sectional view illustrating a touch-pad in the portable computer of FIG. 6.

The cover pad coupling member 500a may be interposed between the mounting part 123 and the cover pad 400 and is adhered to both the mounting part 123 and the cover pad 400. In this configuration, the adhesive strength of the cover pad coupling member 500a need not overcome or hold the entire weight of the cover pad 400 because the weight of the cover pad 400 may be supported by the mounting part 123. Accordingly, the cover pad coupling member 500a may be selected to have an adhesive strength suitable to replace the cover pad 400 from the supporting part 120, thus requiring less force and difficulty to separate and remove the cover pad 400 and minimizing the possibility of damage to the cover pad when removing the cover pad 400 from the supporting part 120.

According to this exemplary embodiment of the present general inventive concept, a process of mounting the touch-pad 600 to the main body casing 100 may also be described with reference to FIGS. 6 and 7.

The cover pad coupling member 500a may be adhered to the mounting part 123, and the cover pad 400 may then be mounted to the mounting part 123 from an upside of the upper plate 110 such that the rear surface of the cover pad 400 faces toward the supporting part 120.

In this configuration, the mounting part 123 may support the weight of the cover pad 400, and the lateral wall 121 may support a side part of the cover pad 400. The cover pad coupling member 500a may be interposed between a rear edge area of the cover pad 400 and the mounting part 123 to couple the cover pad 400 and the mounting part 123.

The touch-pad coupling member 700 may be adhered to the top surface of the touch-pad 600, and the touch-pad 600 may be pressed toward a central area (i.e. second portion) of the rear surface of the cover pad 400 to correspond to the touch-pad 600 from the inside of the main body casing 100 through the opening 125 while the top surface of the touch-pad 600 faces the cover pad 400. In this way, the touch-pad coupling member 700 may overcome the weight of the touch-pad 600 in order to couple the touch-pad 600 with the cover pad 400.

Thus, the touch-pad 600 may be coupled to the main body casing 100 without difficulty and in a relatively simple and cost-effective manner.

As described above, the present general inventive concept may provide a portable computer in which the touch-pad has a relatively simple structure which may be coupled to the main body casing in a relatively simple and cost-effective manner, thereby reducing the cost and enhancing productivity of the portable computer.

Also, the portable computer of the present general inventive concept may include a touch-pad which may be easily separated and replaced, thereby enhancing utilization of resources and facilitating installation, maintenance, and replacement of the touch-pad.

Also, the portable computer may include a cover pad which may be detachable from the main body casing, thereby providing an aesthetically pleasing external appearance, increased reliability, improved performance, and enhanced protection of the touch pad.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A portable computer comprising: a main body casing comprising an upper plate having a recessed portion and an opening formed in the recessed portion; a cover pad which is detachably mounted to the recessed portion of the upper plate and covers the opening, the cover pad having a plate surface and a rear surface, wherein the rear surface of the cover pad covers the entire opening in the recessed portion; a touch-pad which is coupled to the rear surface of the cover pad through the opening to enable the touch-pad to sense a coordinate touched on the plate surface and generate position data of a pointer according to the sensed coordinate; and a touch-pad coupling member which directly couples the cover pad and the touch-pad such that the cover pad supports the weight of the touch-pad.

2. The portable computer according to claim 1, wherein the cover pad is fitted into and melting-bonded to the recessed portion.

3. The portable computer according to claim 1, wherein the recessed portion comprises a lateral wall bent from the upper plate, and a mounting part which is bent and extended from the lateral wall to form the opening, and wherein the rear surface of the cover pad is mounted to the mounting part such that the mounting part supports the weight of the touch-pad via the cover pad.

4. The portable computer according to claim 3, further comprising:
a cover pad coupling member which couples the cover pad and the mounting part.

5. The portable computer according to claim 4, wherein the cover pad coupling member comprises at least one supporting protrusion extended from one of the cover pad and the mounting part toward the other one, and a protrusion accommodating part which is formed on the other one to receive the supporting protrusion.

6. The portable computer according to claim 5, wherein the supporting protrusion is extended from the cover pad toward the mounting part, and the supporting protrusion penetrates through the mounting part so that an end part of the supporting protrusion passes through the protrusion accommodating part, and wherein the end part is melting-bonded to the rear surface of the mounting part.

7. The portable computer according to claim 4, wherein the cover pad coupling member comprises a double-sided adhesive tape.

8. The portable computer according to claim 1, wherein the cover pad comprises a non-conductive material.

9. The portable computer according to claim 1, wherein a corrosion process is applied to a top surface of the cover pad.

10. A portable computer comprising: a main body casing comprising a lateral wall to define an opening, and a mounting part protruding from the lateral wall to define another opening; a cover pad detachably disposed in the opening having a rear surface mounted on the mounting part, the rear surface of the cover pad facing the mounting part covering the entire opening; a touch-pad coupled to the rear surface of the cover pad through the another opening; and a touch-pad coupling member which directly couples the cover pad and the touch-pad such that the cover pad supports the weight of the touch-pad.

11. The portable computer according to claim 10, wherein the opening of the lateral wall is larger than the another opening.

12. The portable computer according to claim 10, wherein the rear surface of the cover pad comprises a first portion disposed on the mounting part and a second portion to correspond to the touch-pad, such that the mounting part supports the weight of the touch-pad via the cover pad.

13. The portable computer according to claim 10, wherein:
the main body casing comprises an upper plate;
the lateral wall is recessed from the upper plate to have an angle with respect to the upper plate; and
the mounting part is extended from the lateral wall to have another angle with respect to the lateral wall.

14. The portable computer according to claim 10, further comprising a gap between the touch-pad and the another opening.

15. The portable computer according to claim 10, wherein the cover pad comprises a plate surface opposite the rear surface, and
the entire plate surface of the cover pad is mounted flush with the upper plate when the cover pad is disposed on the mounting part.

16. The portable computer according to claim 10, wherein the cover pad provides an air-tight seal with the mounting part.

17. A method of installing a touch-pad into a portable computer unit having a main body casing comprising an upper plate, a cover pad having a plate surface and a rear surface, and a supporting part formed from the upper plate, the supporting part being recessed from the upper plate and having an opening to receive the touch-pad, the method comprising: detachably inserting the cover pad into the supporting part so that the plate surface is mounted flush with the upper plate and the rear surface entirely covers the opening of the supporting part; and coupling the touch-pad directly to the rear surface with a touch-pad coupling member through the opening to enable the touch-pad to sense a coordinate touched on the plate surface and generate position data of a pointer according to the sensed coordinate, such that the cover pad supports the weight of the touch-pad.

18. The method according to claim 17, further comprising providing a melting-bonded part to firmly couple the cover pad to the supporting part.

19. The method according to claim 18, further comprising heating the melting-bonded part to separate the cover pad from the supporting part.

* * * * *